(12) United States Patent
Carlson et al.

(10) Patent No.: US 6,266,761 B1
(45) Date of Patent: Jul. 24, 2001

(54) METHOD AND SYSTEM IN AN INFORMATION PROCESSING SYSTEM FOR EFFICIENT MAINTENANCE OF COPIES OF VALUES STORED WITHIN REGISTERS

(75) Inventors: Michael David Carlson, Mountain View, CA (US); Thomas Alan Hoy, Austin, TX (US); Terence Matthew Potter, Austin, TX (US); David Domenic Putti, Austin, TX (US)

(73) Assignees: International Business Machines Corporation, Armonk, NY (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/096,836

(22) Filed: Jun. 12, 1998

(51) Int. Cl.$^7$ ...................................................... G06F 15/00
(52) U.S. Cl. ............................. 712/23; 712/216; 712/217
(58) Field of Search .............................. 712/200, 23, 216, 712/217; 713/210, 400

(56) References Cited

U.S. PATENT DOCUMENTS

| | | | |
|---|---|---|---|
| 5,539,911 | * | 7/1996 | Nguyen et al. ........................ 712/23 |
| 5,764,943 | * | 6/1998 | Wechsler ............................. 712/218 |
| 5,764,970 | * | 6/1998 | Rana et al. ........................... 712/233 |
| 5,946,468 | * | 8/1999 | Witt et al. ............................. 712/23 |
| 5,987,582 | * | 11/1999 | Mahalingaiah ....................... 712/200 |
| 5,996,085 | * | 11/1999 | Cheong et al. ....................... 713/400 |

* cited by examiner

Primary Examiner—Larry D. Donaghue
(74) Attorney, Agent, or Firm—Anthony V. S. England; Felsman, Bradley, Vaden, Gunter & Dillon, LLP

(57) ABSTRACT

A method and system in an information processing system are disclosed for efficiently maintaining copies of values stored within a plurality of registers. The information processing system includes first circuitry, second circuitry, and a plurality of buffers. The first circuitry processes an execution state of a first type of instruction which always specifies a destination of at least one of a first type of register or a second type of register, and which outputs first information in response thereto. The first circuitry also processes an execution stage of a second type of instruction which always specifies a destination of only a third type of register, and outputs second information in response thereto. The plurality of buffers are coupled to the execution circuitry for storing the output first and second information, wherein at least one of the buffers is for storing the output first information independent of which of the first and second types of registers is specified by the first type of instruction. The second circuitry is coupled to the buffers for processing a completion stage of the first type of instruction, and writing the stored first information into at least one of the first or a second type of register in response thereto. The second circuitry also processes a completion stage of the second type of instruction, and writes the stored second information into only the third type of register in response thereto.

26 Claims, 6 Drawing Sheets

METHOD AND SYSTEM IN AN INFORMATION PROCESSING SYSTEM FOR EFFICIENT MAINTENANCE OF COPIES OF VALUES STORED WITHIN REGISTERS

BACKGROUND OF THE INVENTION

1. Technical Field

The depicted illustrative embodiment relates to superscalar data processing systems and, in particular, to efficiently maintaining copies of values stored within a plurality of registers in a superscalar data processing system. Still more particularly, the illustrative embodiment relates to establishing within a superscalar data processing system a queue within which copies of values stored within a plurality registers are sequentially stored.

2. Description of the Related Art

A superscalar data processing system is a data processing system which includes a microprocessor architecture which is capable of executing multiple instructions per clock cycle. In order to execute multiple instructions per clock cycle, multiple independent functional units that can execute concurrently are required. These multiple instructions may be executed in their original sequence intended by the programmer, or out of order in a sequence which is different in some way from the original sequence.

The overlap of the fetching and decoding of one instruction with the execution of a second instruction is called pipelining. In pipelined superscalar data processing systems, care must be taken to avoid dependencies where multiple instructions are fetched, decoded, and executed in a single cycle.

There are three types of data dependencies. A read-after-write hazard occurs when an instruction tries to read a source before a previous instruction writes it. A write after read hazard occurs when an instruction tries to write a destination before a previous instruction reads it. A write after write hazard occurs when an instruction writes a destination before a previous instruction writes it.

One solution to solving the dependence problem is to rename the logical registers associated with the instructions. By renaming the logical registers, each instruction within the cycle can be executed concurrently and correctly.

One problem in the design of microprocessors is the management of available resources. Resources typically become free after some period of time and then are available to be utilized again. Resources may include, among other types, execution units, buses, or registers. One type of register resource is a special-purpose register which is typically a register designated for a special purpose. The special-purpose registers contain control information such as the count or link registers included in the Power PC architecture.

Special-purpose registers may be difficult to manage during processing in superscalar data processing systems because each is a unique resource and because the programmer's model of sequential execution must be maintained.

Therefore a need exists for a method and system in a superscalar data processing system for efficiently maintaining copies of values stored within a register by storing copies within a queue and storing a queue entry identifier within an array.

SUMMARY OF THE INVENTION

It is therefore one object of the depicted illustrative embodiment to provide an improved superscalar data processing system.

It is another object of the illustrative embodiment to efficiently maintain copies of values stored within a plurality of registers in a superscalar data processing system.

It is yet another object of the illustrative embodiment to provide a method and system within a superscalar data processing system for establishing a queue within which copies of values stored within a plurality registers are sequentially stored.

The foregoing objects are achieved as is now described. A method and system in an information processing system are disclosed for efficiently maintaining copies of values stored within a plurality of registers. The information processing system includes first circuitry, second circuitry, and a plurality of buffers. The first circuitry processes an execution state of a first type of instruction which always specifies a destination of at least one of a first type of register or a second type of register and which outputs first information in response thereto. The first circuitry also processes an execution stage of a second type of instruction which always specifies a destination of only a third type of register and outputs second information in response thereto. The plurality of buffers are coupled to the execution circuitry for storing the output first and second information, wherein at least one of the buffers is for storing the output first information independent of which of the first and second types of registers is specified by the first type of instruction. The second circuitry is coupled to the buffers for processing a completion stage of the first type of instruction, and writing the stored first information into at least one of the first or a second type of register in response thereto. The second circuitry also processes a completion stage of the second type of instruction, and writes the stored second information into only the third type of register in response thereto.

The above as well as additional objectives, features, and advantages of the illustrative embodiment will become apparent in the following detailed written description.

BRIEF DESCRIPTION OF THE DRAWINGS

The novel features are set forth in the appended claims. The illustrative embodiment itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

An exemplary embodiment of the present invention and its advantages are better understood by referring to FIGS. 1–3D of the drawings, like numerals being used for like and corresponding parts of the accompanying drawings.

Figure 1:
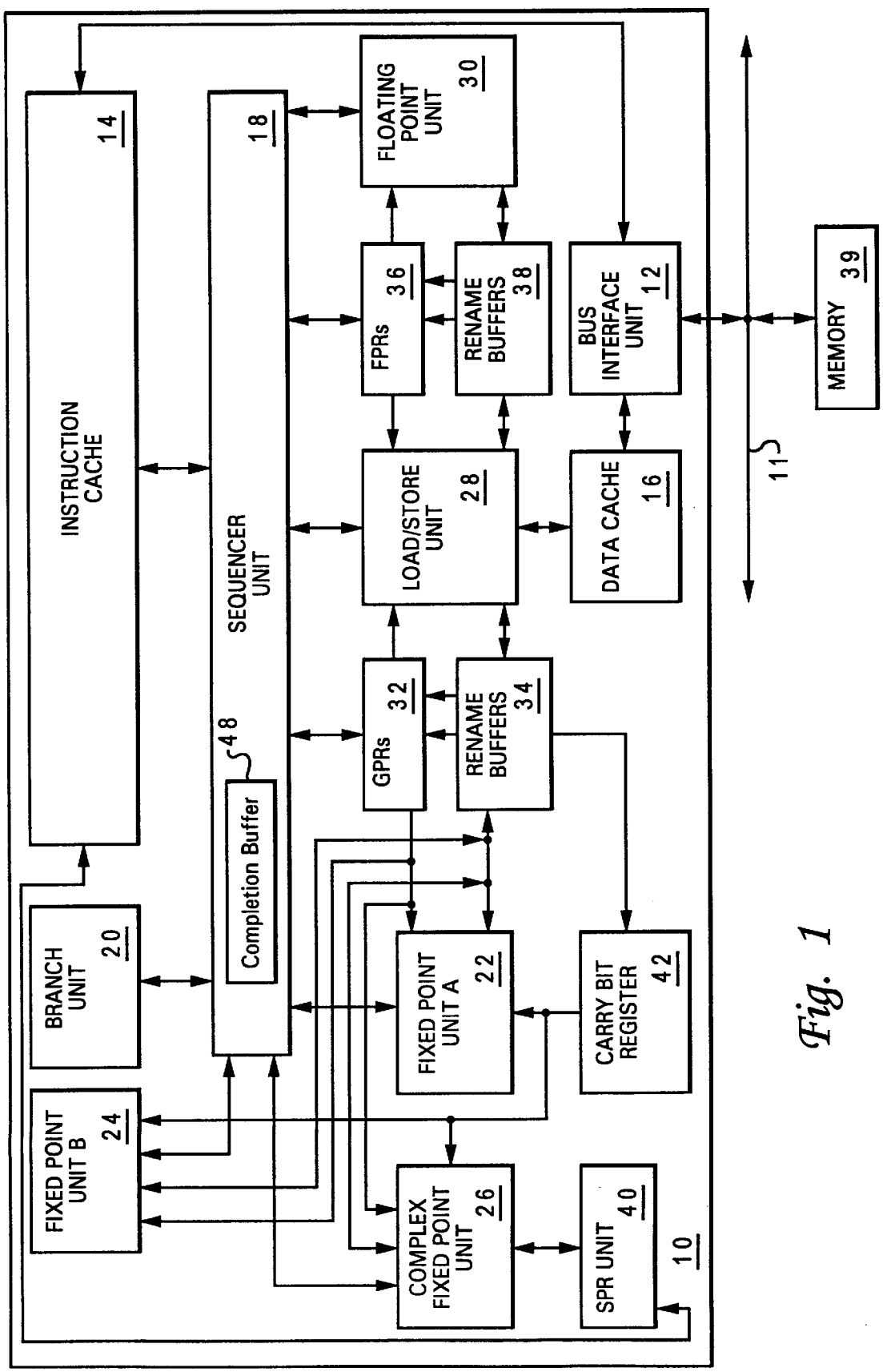
FIG. 1 depicts a high-level block diagram of a superscalar data processing system 10 which may be utilized to implement the method and system of the illustrative embodiment.

FIG. 1 is a block diagram of a processor 10 system for processing information according to the preferred embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment, the execution circuitry of processor 10 includes multiple execution units, namely a branch unit 20, a fixed-point unit A ("FXUA") 22, a fixed-point unit B ("FXUB") 24, a complex fixed-point unit ("CFXU") 26, a load/store unit ("LSU") 28, and a floating-point unit ("FPU") 30. FXUA 22, FXUB 24, CFXU 26, and LSU 28 input their source operand information from general-purpose architectural registers ("GPRs") 32 and fixed-point rename buffers 34. Moreover, FXUA 22 and FXUB 24 input a "carry bit" from a carry bit ("CA") register 42. FXUA 22, FXUB 24, CFXU 26, and LSU 28 output results (destination operand information) of their operations for storage at selected entries in fixed-point rename buffers 34. Also, CFXU 26 inputs and outputs source operand information and destination operand information to and from special-purpose register processing unit ("SPR unit") 40.

FPU 30 inputs its source operand information from floating-point architectural registers ("FPRs") 36 and floating-point rename buffers 38. FPU 30 outputs results (destination operand information) of its operation for storage at selected entries in floating-point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed-point mathematical operations on source operands, such as addition, subtraction, ANDing, ORing and XORing. CFXU 26 executes a second class of fixed-point operations on source operands, such as fixed-point multiplication and division. FPU 30 executes floating-point operations on source operands, such as floating-point multiplication and division.

As information is stored at a selected one of rename buffers 34, such information is associated with a storage location (e.g.. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback."

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 18 selectively inputs (from instruction cache 14) one or more instructions from one or more memory addresses storing the sequence of instructions discussed further hereinabove in connection with branch unit 20, and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28, and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete." Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 26) may require more than one cycle. Accordingly, a variable delay may occur between a particular instruction's execution and completion stages in response to the variation in time required for completion of preceding instructions.

A completion buffer 48 is provided within sequencer 18 to track the completion of the multiple instructions which are being executed within the execution units. Upon an indication that an instruction or a group of instructions have been completed successfully, in an application specified sequential order, completion buffer 48 may be utilized to initiate the transfer of the results of those completed instructions to the associated general-purpose registers.

A special-purpose register processing unit 40 may also be provided. Special-purpose register processing unit 40 includes a plurality of buffers, shown in FIG. 2 as array 90 and queue 60. Array 90 includes special-purpose architected registers. Queue 60 includes special-purpose rename registers. When special-purpose registers ("SPRs") are provided, instructions may write to one of these special-purpose registers or may read a stored value, or stored data, from one of the special-purpose registers. A first type of instruction is a "move to" type of instruction which is further broken into two groups. The first group, move to a special-purpose register from another special-purpose register moves data associated with the instruction, the first information, from a first type of SPR to a second type of SPR. The second group, move to a special-purpose register from a general-purpose register, moves data associated with the instruction, the first information, from a general-purpose register, the third type of register, to either a first or second type of SPR. A second type of instruction is a "move from" type of instruction and moves data associated with the instruction, the second information, from either the first type of SPR or the second type of SPR to a general-purpose register, the third type of register. One or more of these registers may need to be renamed during concurrent processing of multiple instructions in order to enable the instructions to execute quickly and properly.

Figure 2:
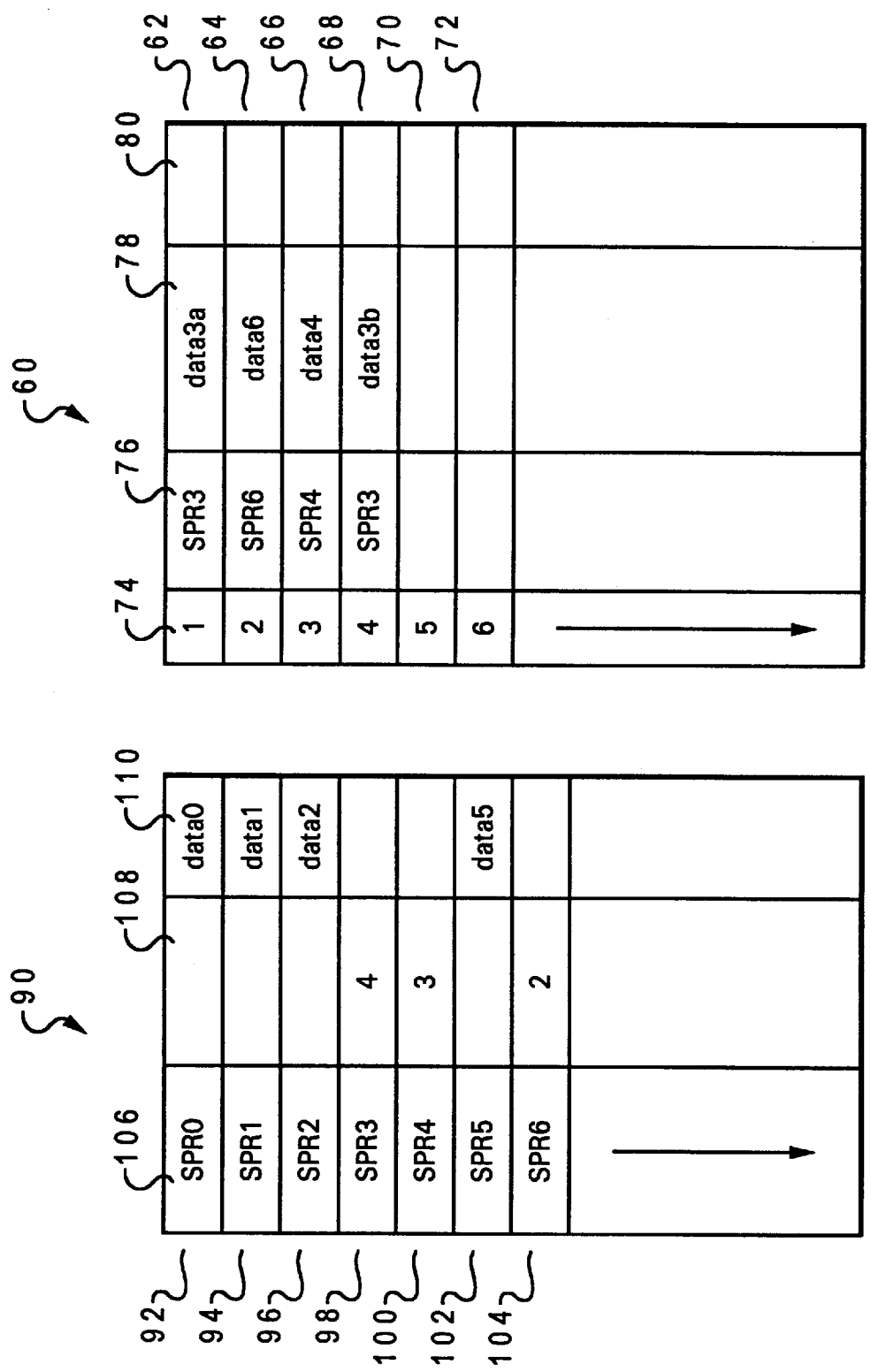
FIG. 2 illustrates a pictorial representation of a queue and an array included within superscalar data processing system 10 in accordance with the method and system of the illustrative embodiment.

FIG. 2 illustrates a pictorial representation of a queue 60 and an array 90 included within special-purpose register processing unit 40 in accordance with the illustrative embodiment. A queue 60 is provided to enable the instructions to execute quickly and properly. Queue 60 includes a plurality of queue entry fields, such as queue entry fields 62, 64, 66, 68, 70, and 72. Each queue entry field includes a queue entry identifier field, a register identifier field, a data field, and a valid field. For example, queue entry field 62 includes queue entry identifier field 74, register identifier field 76, data field 78, and valid field 80. Queue entry fields are included sequentially within queue 60; i.e. queue entry field 72 follows field 70 which follows field 68, etc.

When an instruction is dispatched that stores a value in a particular special-purpose register, a determination of the next available queue entry field in the sequence within queue 60 is made. The instruction is associated with the special-purpose register within which the value is to be stored. A queue entry is created for this instruction which includes an identification of the particular special-purpose register associated with the instruction, a copy of the value to be stored in the particular special-purpose register, a queue entry identifier, and valid bits. In this manner, each queue entry field is associated with an instruction, and thereby with the special-purpose register associated with that instruction. The queue entry is then stored in the next available queue entry field within the sequence. The queue entry identifier is preferably a number identifying in which queue entry field the queue entry was stored. For example, as depicted in FIG. 2, queue entry fields 62, 64, 66, and 68 have stored entries. Therefore, queue entry field 70 is the next available queue entry field in the sequential order.

For example, for queue entry field 66, an instruction had been dispatched which stored a value in special-purpose register 4. A queue entry identifier of "3" is included in the entry, as well as the register identifier "SPR4" and data which is represented as "data4." The data stored in data field 78 of queue 60 is a copy of the value stored in the particular special-purpose register by the instruction. Valid bits may be stored in a valid field to indicate whether or not the entry and the data are valid.

Queue 60 may include multiple copies of values for a particular special-purpose register. As each instruction is dispatched which stores a value in a special-purpose register, a queue entry is created. Any number of instructions may be concurrently dispatched which all store a value within the same special-purpose register. A separate queue entry will be created and associated with each instruction. Therefore, multiple queue entries will be stored within queue 60 which all include a copy of a value stored within the particular special-purpose register. Because the queue entries are stored sequentially within queue 60, a copy of the most current value stored within the particular special-purpose register may be obtained by reading the last stored entry within the sequence which is associated with the particular special-purpose register. For example, FIG. 2 depicts queue entry field 62 and queue entry field 68 both being associated with special-purpose register 3.

When a queue entry is created, a corresponding array entry is stored in array 90. Array 90 includes multiple array entry fields 92, 94, 96, 98, 100, 102, and 104. Each array entry field is associated with a different one of the special-purpose registers. For example, if there exist 16 different special-purpose registers, array 90 will include 16 different array entry fields. Each array entry field includes a register identifier field, a queue entry identifier field, and a data field. As an example, array entry field 92 includes register identifier field 106, queue entry identifier field 108, and data field 110. Array entry field 92 is associated with special-purpose register 0. Array entry field 94 is associated with special-purpose register 1. Any number of array entry fields may be included so that each array entry field is associated with a different special-purpose register.

The array entry stored in the array entry field of array 90 which is associated with the special-purpose register associated with the queue entry field in which the queue entry is stored is updated in response to each storage of a queue entry within queue 60. The instruction which caused a queue entry to be stored in queue entry field 66 was associated with special-purpose register 4. Therefore, array entry field 100, which is associated with special-purpose register 4, includes the register identifier "SPR4" and is stored in queue entry field 66. The queue identifier "3" is also included in the entry as a pointer to the corresponding queue entry. Array entry field 98, which is associated with special-purpose register 3, includes the register identifier "SPR3" and is stored in queue entry field 68. The queue identifier "4" is also included in the entry as a pointer to the corresponding queue entry which includes the most recently stored entry in queue 60.

Array 90 includes either data or the most recent queue entry identifier for each special-purpose register associated with each array entry field of array 90. Therefore, in the illustrative embodiment, array 90 will not include both data and a queue entry identifier. A copy of the value stored within the special-purpose register associated with a particular instruction will be stored in either queue 60 or array 90. When a queue entry identifier is stored within array 90, the copy of the data stored in the associated special-purpose register is not included within array 90, but is stored instead within the corresponding queue entry field included within queue 60.

When an instruction is dispatched which reads a value stored in a special-purpose register, an array entry field is determined which is the array entry field associated with the particular special-purpose register which this instruction is to read. If the array entry field includes data, that data is then associated with this instruction. Otherwise, the array entry field will include a queue entry identifier which then will be associated with the instruction. When this instruction is executed, if data was associated with the instruction, the instruction is then executed using the data. However, when this instruction is executed, if a queue entry identifier was associated with the instruction, the queue entry field which is associated with the queue entry identifier is determined. The queue entry stored within the queue entry field is then read. The data stored in that particular queue entry is then used when executing the instruction.

If the instruction is a branch instruction, the SPR data is used to control execution flow. This is the primary use of the link and count registers. The link register is used to store an absolute address and often is used to branch to and return from subroutines. The count register is used to store a count value which can be decremented and tested for use in control flow. Branch execute unit 20 uses the special-purpose register data to compute the address of the next appropriate instruction and controls the flow of execution. The efficient management of special-purpose registers using the special-purpose register array 90 and the special-purpose register queue 60 allows for quick turnaround of critical branch target calculations.

When the instruction that writes the special-purpose register completes, the entry in special-purpose register queue 60 corresponding to that instruction can be committed to the architected state of the machine. All instructions complete in order. The data in the special-purpose register queue entry is copied to the entry in special-purpose register array 90 that corresponds to the special-purpose register written by the instruction. The entry in special-purpose register queue 60 is then deallocated.

Figure 3A:
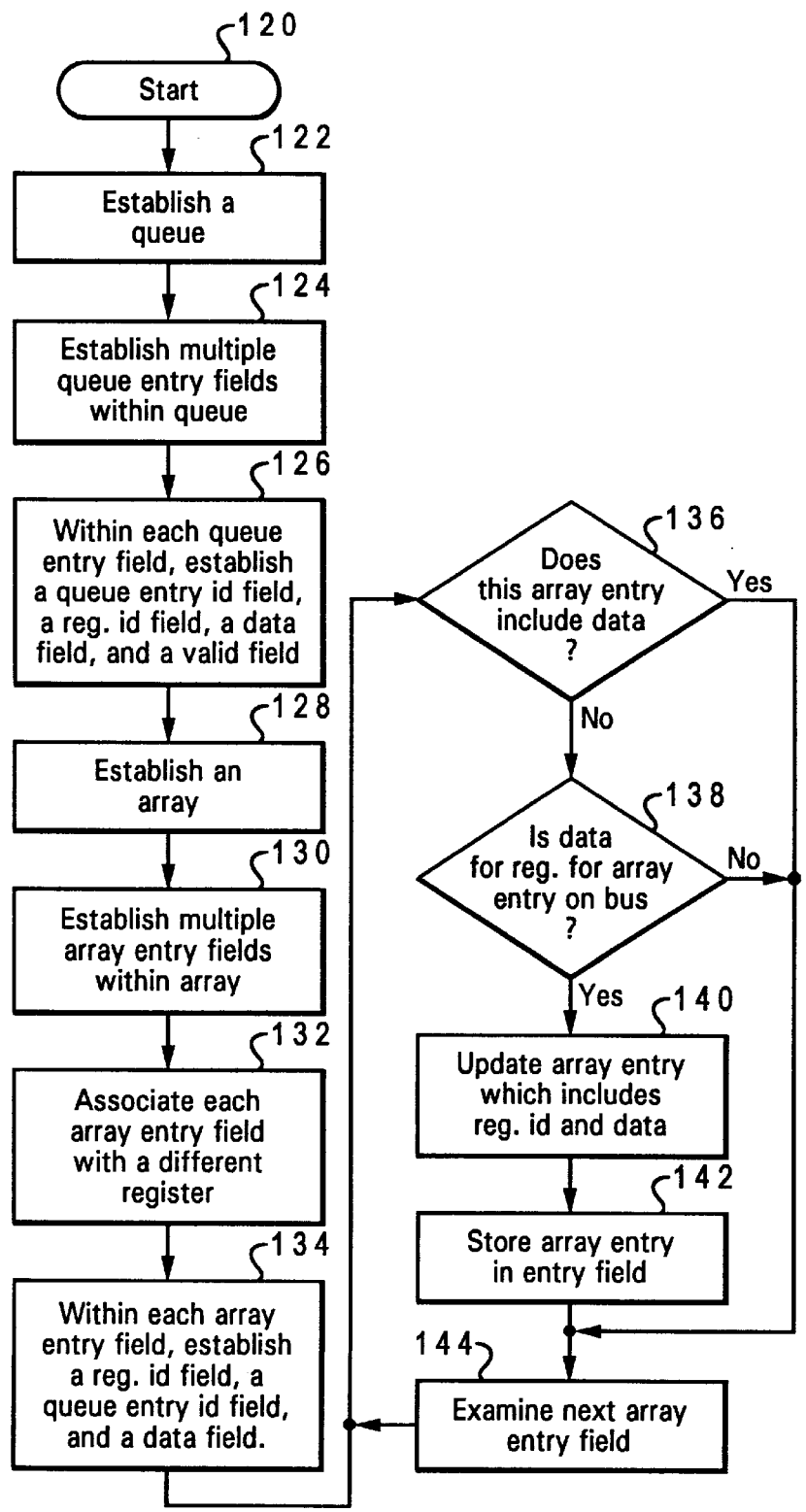
FIG. 3A is a high-level flow chart depicting the establishment of an array and a queue and the storage of data and queue entry identifiers within the array in a superscalar data processing system in accordance with the method and system of the illustrative embodiment.

FIG. 3A is a high-level flow chart depicting the establishment of an array and a queue, and the storage of copies of data and queue entry identifiers within the array in a superscalar data processing system in accordance with the method and system of the illustrative embodiment. The process starts as depicted at block 120 and then passes to block 122 which illustrates the establishment of a queue. Next, block 124 depicts the establishment of multiple queue entry fields within the queue in a sequential order. Block 126 then illustrates the establishment of a queue entry identifier field, a register identifier field, a data field, and a valid field within each queue entry field. The process then passes to block 128 which depicts the establishment of an array. Block 130 next illustrates the establishment of multiple array entry fields within the array. Thereafter, block 132 depicts the association of each array entry field with a different register. The register may be any type of register, such as a special-purpose register.

The process then passes to block 134 which illustrates the establishment of a register identifier field, a queue entry identifier field, and a data field for each array entry field within the array. Next, block 136 depicts a determination of whether or not an array entry includes data. If a determination is made that this array entry does not include data, the process passes to block 138 which depicts a determination of whether or not data to be stored in this register is on a bus. If a determination is made that data is on a bus, the process passes to block 140 which illustrates the updating of an array entry which includes a register identifier for this register and a copy of the data. Next, block 142 depicts the storage of the array entry in the array entry field for this register. Block 144 depicts the examination of the next array entry field within the array. The process then passes to block 136.

Referring again to block 138, if a determination is made that the data for the register associated with this entry field is not on the bus, the process passes to block 144. Referring again to block 136, if a determination is made that this array entry does include a copy of data, the process passes to block 144. In this manner, multiple array entries are stored in the array, where each entry is associated with a particular register and may include a copy of the data to be stored in the particular register.

Figure 3B:
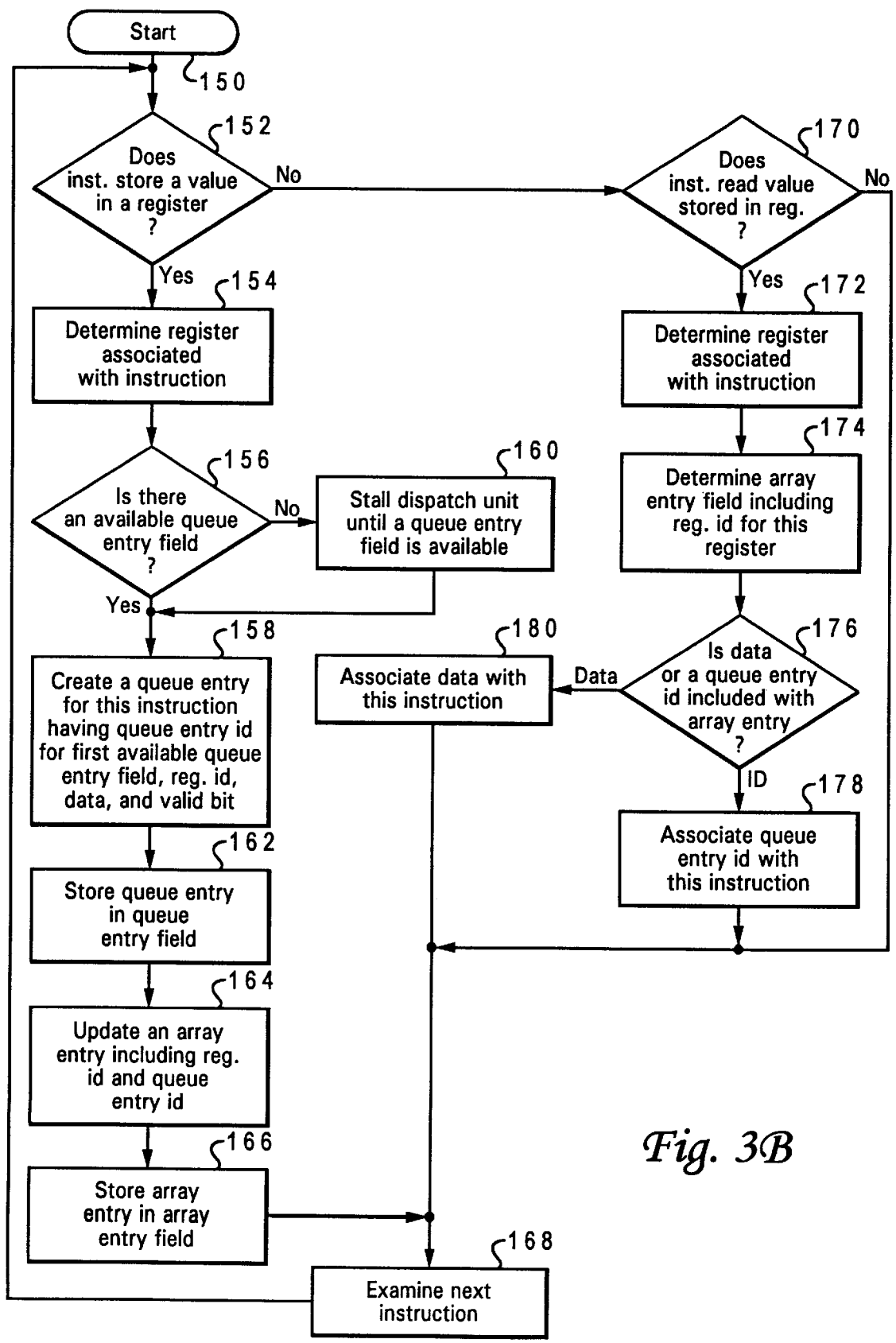
FIG. 3B is a high-level flow chart depicting the dispatching of instructions, the creation of queue entries and array entries for instructions which store values within registers, and the association of data or queue entry identifiers for instructions which read values stored in registers in a superscalar data processing system in accordance with the method and system of the illustrative embodiment.

FIG. 3B is a high-level flow chart depicting the dispatching of instructions, the creation of queue entries for instructions which store values within registers, and the association of data or queue entry identifiers for instructions which read values stored in registers in a superscalar data processing system in accordance with the method and system of the illustrative embodiment. The process starts as depicted at block 150 and then passes to block 152 which illustrates a determination of whether or not the instruction being dispatched is an instruction which stores a value in a register. If a determination is made that the instruction stores a value in a register, the process passes to block 154 which depicts a determination of the register which is associated with this instruction. Next, block 156 illustrates a determination of whether there is an available queue entry field within the queue. If a determination is made that there is an available queue entry field, the process passes to block 158. Referring again to block 156, if a determination is made that there are no available queue entry fields, the process passes to block 160 which depicts the stalling of the dispatch unit until a queue entry field is available. The process then passes to block 158.

Block 158 illustrates the creation of a queue entry for this instruction. The queue entry includes a queue entry identifier for the first available queue entry field in the sequence, a register identifier for the register which is associated with this instruction, a copy of the data to be stored in this register, and valid bits indicating whether the entry and data are valid. Next, block 162 depicts the storage of the entry in the queue entry field. Block 164 then illustrates the updating of a corresponding array entry which includes the register identifier and the queue entry identifier for the queue entry field in which a copy of the data is stored. Thereafter, block 166 depicts the storage of the array entry in the array entry field. Block 168 next illustrates the examination of the next instruction being dispatched. The process then returns to block 152.

Referring again to block 152, if a determination is made that the instruction being dispatched does not store a value in a register, the process passes to block 170 which illustrates a determination of whether or not this instruction reads a value stored within a register. If a determination is made that this instruction does not read a value stored within a register, the process passes to block 168. Referring again to block 170, if a determination is made that this instruction does read a value stored within a register, the process passes to block 172 which depicts a determination of the register which is associated with this instruction. Block 174 next illustrates a determination of the array entry field which includes a register identifier for this register. This array entry field is associated with this register. Thereafter, block 176 depicts a determination of whether data or a queue entry identifier is stored within the array entry field. If a determination is made that a queue entry identifier is stored within the array entry field, the process passes to block 178 which illustrates the association of the queue entry identifier with this instruction. The process then passes to block 168. Referring again to block 176, if a determination is made that data is stored within the array entry field, the process passes to block 180 which illustrates the association of the data with this instruction. The process then passes to block 168.

Figure 3C:
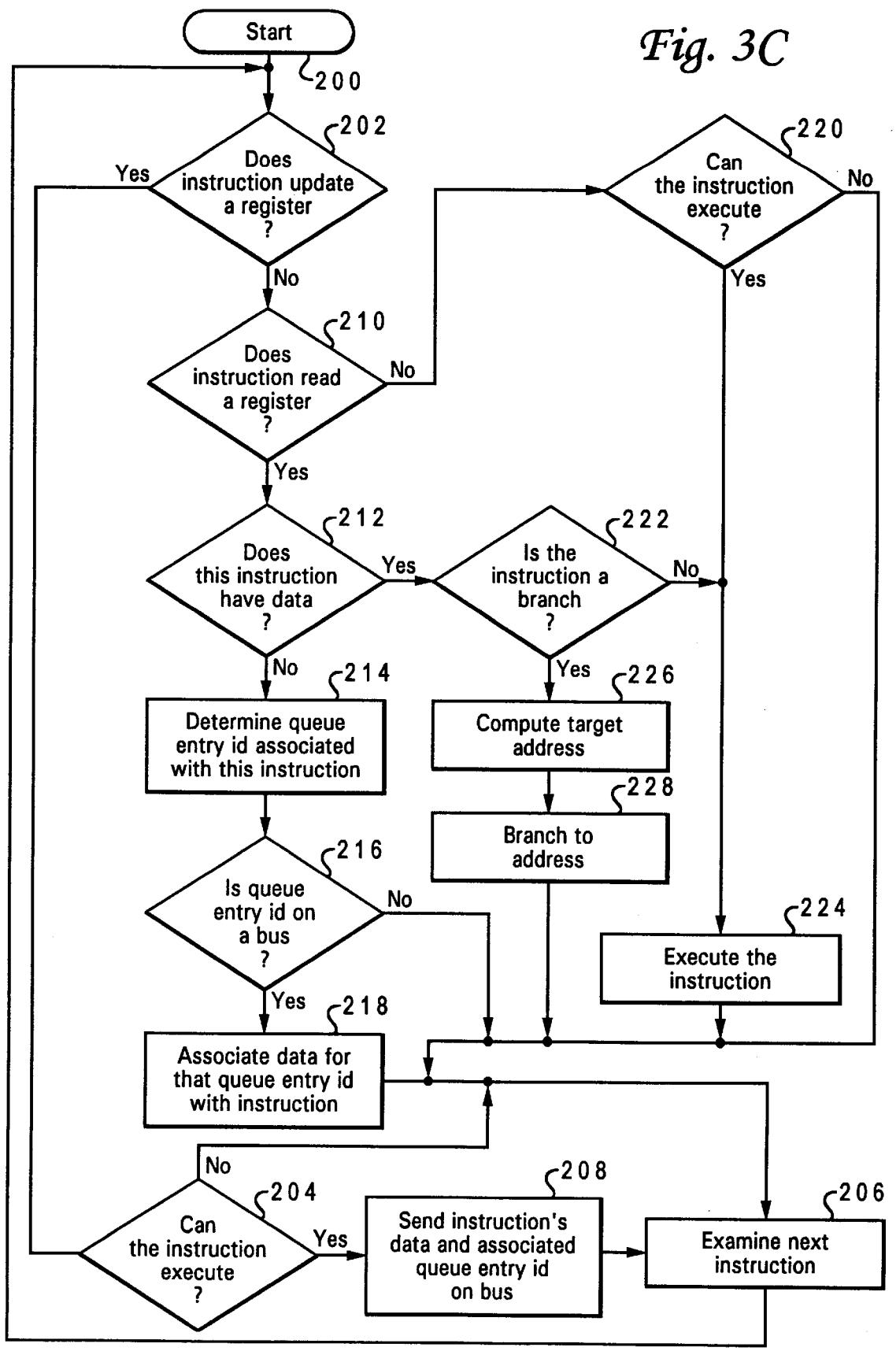
FIG. 3C is a high-level flow chart depicting the execution of instructions in a superscalar data processing system in accordance with the method and system of the illustrative embodiment.

FIG. 3C is a high-level flow chart depicting the execution of instructions in a superscalar data processing system in accordance with the method and system of the illustrative embodiment. The process starts as depicted at block 202 which illustrates a determination of whether or not the instruction being executed stores a value in a register. If a determination is made that the instruction stores a value in a register, the process passes to block 204 which depicts a determination of whether or not the instruction can execute. An instruction cannot execute if the data needed to execute is not yet available. If all data needed to execute is available, the instruction will be allowed to execute. If a determination is made that the instruction cannot execute, the process passes to block 206 which illustrates the examination of the next instruction. Thereafter, the process returns to block 202.

Referring again to block 204, if a determination is made that the instruction can execute, the process passes to block 208 which depicts sending the data and associated queue entry identifier for the instruction on a bus. The process then again passes to block 206.

Referring again to block 202, if a determination is made that this instruction does not store a value in a register, the process passes to block 210 which depicts a determination of whether or not the instruction reads a value stored in a register. If a determination is made that the instruction does read a value stored in a register, the process passes to block 212 which illustrates a determination of whether or not this instruction is associated with data. This instruction may have data already associated with it by the process illustrated by blocks 176 and 180 from FIG. 3B. If a determination is made that this instruction does not have associated data, the instruction will then have a queue entry identifier associated with it. The process passes to block 214 which depicts the determination of the queue entry identifier associated with the instruction. Next, block 216 illustrates a determination of whether or not the queue entry identifier is on a bus. If a determination is made that the queue entry identifier is not on a bus, the process again passes to block 206. Referring again to block 216, if a determination is made that the queue entry identifier is on a bus, the process passes to block 218 which depicts the association of the data for this queue entry identifier with this instruction. Thereafter, the process passes to block 206.

Referring again to block 212, if a determination is made that this instruction already has associated data, the process passes to block 222 which illustrates a determination of whether or not this instruction is a branch instruction. Referring again to block 210, if a determination is made that the instruction does not read a value stored in a register, the process passes to block 220 which depicts a determination of whether or not the instruction can execute. If a determination is made that the instruction can execute, the process passes to block 224. Block 224 illustrates the execution of the instruction. Referring again to block 220, if a determination is made that the instruction cannot execute, the process passes to block 206.

Referring again to block 222, if a determination is made that this instruction is not a branch instruction, the process passes to block 224. If a determination is made that this instruction is a branch instruction, the process passes to block 226 which depicts the computation of the target address for the branch instruction. Next block 228 illustrates the branching to the target address. Thereafter, the process again passes to block 206.

Figure 3D:
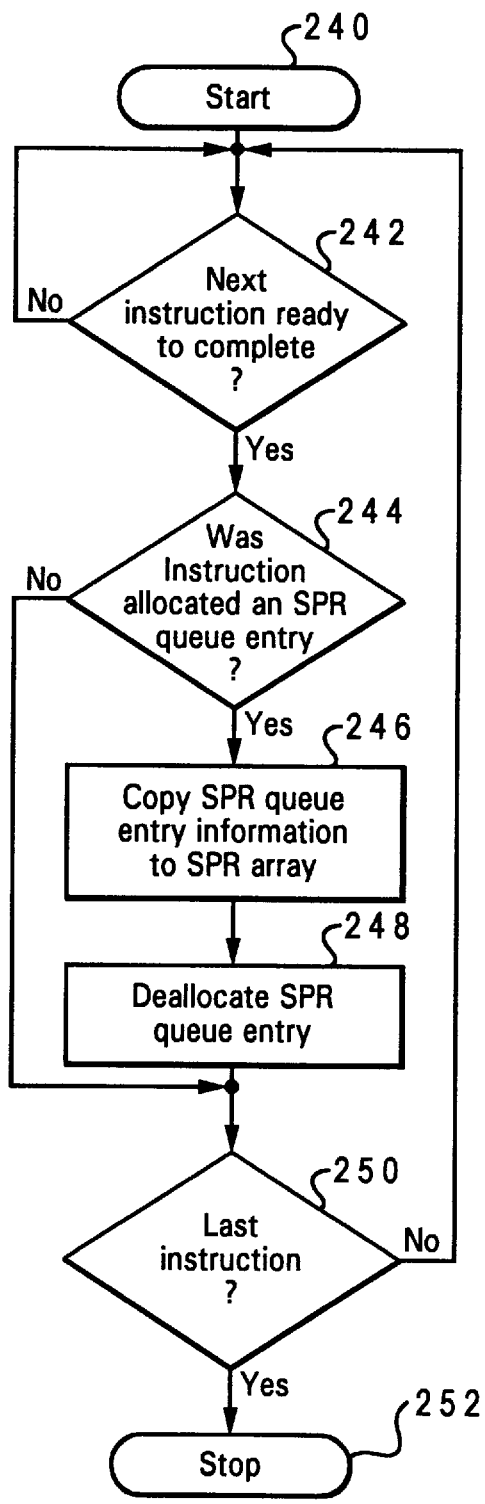
FIG. 3D is a high-level flow chart illustrating the completion of instructions in a superscalar data processing system in accordance with the method and system of the illustrative embodiment.

FIG. 3D is a high-level flow chart illustrating the completion of instructions in a superscalar data processing system in accordance with the method and system of the illustrative embodiment. The process starts as depicted at block 240 and then passes to block 242 which illustrates a determination of whether or not the next instruction is ready to complete. If a determination is made that the next instruction is not ready to complete, the process passes back to block 242. If a determination is made that the next instruction is ready to complete, the process passes to block 244 which illustrates a determination of whether or not the instruction was allocated an SPR queue entry. If a determination is made that the instruction was allocated an SPR queue entry, the process passes to block 246. If a determination is made that the instruction was not allocated an SPR queue entry, the process passes to block 250.

Block 246 depicts the copying of the SPR queue entry information to the SPR array. Next, block 248 illustrates the deallocation of the SPR queue entry. Block 250 then depicts a determination of whether or not this is the last instruction to be completed. If a determination is made that this is not the last instruction to be completed, the process passes back to block 242. If a determination is made that this is the last instruction to be completed, the process passes to block 252 which depicts the termination of the process.

While an illustrative embodiment has been particularly shown and described, it will be understood by those skilled in the art that various changes in form and detail may be made therein without departing from the spirit and scope of the embodiment.

What is claimed is:

1. An information processing system, comprising:

first circuitry for:
processing an execution stage of a first type of instruction which always specifies at least one of a first type of register or a second type of register, and outputting first information in response thereto;
processing an execution stage of a second type of instruction which always specifies only a third type of register, and outputting second information in response thereto;

a plurality of rename buffers coupled to said execution stage for storing a copy of said output first information, one of said plurality of rename buffers being allocated for each said first type of instruction, wherein at least one of said buffers is for storing said output first information independent of which of said first and second types of registers is specified by said first type of instruction, and wherein said at least one of a first type of register or a second type of register is temporarily renamed as one of said plurality of rename buffers; and second circuitry coupled to said buffers for:
determining, during a completion stage of each one of a plurality of instructions processed by said information processing system, whether one of said plurality of rename buffers was allocated for each one of said plurality of instructions;
processing a completion stage of said first type of instruction, and writing said copy of said first information stored in said one of said plurality of rename buffers into at least one of said first or a second type of register in response thereto;
processing a completion stage of said second type of instruction, and writing said second information into only said third type of register in response thereto;
deallocating said one of said plurality of rename buffers allocated for said each one of said plurality of instructions in response to a determination that said one of said plurality of rename buffers was allocated.

2. The system of claim 1 wherein said first type of register is a first type of special-purpose register, said second type of register is a second type of special-purpose register, and said third type of register is a general-purpose register.

3. The system of claim 1 wherein said first circuitry always processes said execution stage of said first type of instruction by performing only non-arithmetic operations.

4. The system of claim 3 wherein said first circuitry processes said execution stage of said first type of instruction by performing only non-arithmetic operations to move said first information into at least one of said first or second types of registers.

5. The system of claim 4 wherein said copy of said first information is from said third type of register, and said second circuitry is for writing said copy of said first information into at least one of said first or second types of registers in response to processing said completion stage of said first type of instruction.

6. The system of claim 4 wherein said copy of said first information is from said first or second type of register, and said second circuitry is for writing said copy of said first information into at least one of said first or second types of registers in response to processing said completion stage of said first type of instruction.

7. The system of claim 1 wherein said first circuitry always processes said execution stage of said second type of instruction by performing only non-arithmetic operations.

8. The system of claim 7 wherein said second information is from at least one of said first or second types of registers, and said second circuitry is for writing said second information into said third type of register in response to processing said completion stage of said second type of instruction.

9. The system of claim 1 wherein said first type of register is a first type of special-purpose register, and wherein said second type of register is a second type of special-purpose register.

10. The system of claim 9 wherein said third type of register further includes at least one general-purpose register.

11. The system of claim 1 wherein said buffers include:
a first set of buffers for storing said copy of said first information; and
a second set of buffers for storing said output second information.

12. An information processing system, comprising:

first circuitry for:
processing an execution stage of a first type of instruction which always specifies at least one of a first type of register or a second type of register, and outputting first information in response thereto;
processing an execution stage of a second type of instruction which always specifies only a third type of register, and outputting second information in response thereto;

a plurality of buffers coupled to said execution stage for storing said output first and second information, wherein at least one of said buffers is for storing said output first information independent of which of said first and second types of registers is specified by said first type of instruction;

second circuitry coupled to said buffers for:
processing a completion stage of said first type of instruction, and writing said stored first information into at least one of said first or a second type of register in response thereto; and
processing a completion stage of said second type of instruction, and writing said stored second information into only said third type of register in response thereto; and wherein said second circuitry is for writing said stored first information into at least one of said first or second types of registers, and comprising third circuitry for computing an address of an instruction in response to said written and stored first information.

13. An information processing system, comprising:

first circuitry for:
processing an execution stage of a first type of instruction which always specifies at least one of a first type of register or a second type of register, and outputting first information in response thereto;
processing an execution stage of a second type of instruction which always specifies only a third type of register, and outputting second information in response thereto;

a plurality of buffers coupled to said execution stage for storing said output first and second information, wherein at least one of said buffers is for storing said output first information independent of which of said first and second types of registers is specified by said first type of instruction;

second circuitry coupled to said buffers for:
processing a completion stage of said first type of instruction, and writing said stored first information into at least one of said first or a second type of register in response thereto; and
processing a completion stage of said second type of instruction, and writing said stored second information into only said third type of register in response thereto; and
wherein said second circuitry is for writing said stored first information into at least one of said first or second types of registers, and comprising third circuitry for branching to an address of an instruction in response to said written and stored first information.

14. A method in an information processing system, said method comprising the steps of:
processing within first circuitry an execution stage of a first type of instruction which always specifies at least one of a first type of register or a second type of register, and outputting first information in response thereto;
processing within first circuitry an execution stage of a second type of instruction which always specifies only a third type of register, and outputting second information in response thereto;
allocating one of said plurality of rename buffers for each said first type of instruction and storing a copy of said first information in said one of said plurality of rename buffers coupled to said execution stage, wherein at least one of said buffers is for storing said copy of said first information independent of which of said first and second types of registers is specified by said first type of instruction, and temporarily renaming said at least one of a first type of register or a second type of register as one of said plurality of rename buffers;
determining within second circuitry coupled to said buffers a completion stage of each one of a plurality of instructions processed by said information processing system whether one of said plurality of rename buffers was allocated for each one of said plurality of instructions;
processing within said second circuitry a completion stage of said first type of instruction, and writing said copy of said first information stored in said one of said plurality of rename buffers into at least one of said first or a second type of register in response thereto;
processing within said second circuitry a completion stage of said second type of instruction, and writing said second information into only said third type of register in response thereto; and
deallocating, within said second circuitry, one of said plurality of rename buffers allocated for said each one of said plurality of instructions in response to a determination that said one of said plurality of rename buffers was allocated.

15. The method of claim 14 wherein said first type of register is a first type of special-purpose register, said second type of register is a second type of special-purpose register, and said third type of register is a general-purpose register.

16. The method of claim 14 further comprising always processing within said first circuitry of said execution stage said first type of instruction by performing only non-arithmetic operations.

17. The method of claim 16 further comprising processing within said first circuitry said execution stage of said first type of instruction by performing only non-arithmetic operations to move said first information into at least one of said first or second types of registers.

18. The method of claim 17 further comprising storing said copy of said first information from said third type of register, and writing said copy of said first information stored in said one of said plurality of rename buffers utilizing said second circuitry into at least one of said first or second types of registers in response to processing said completion stage of said first type of instruction.

19. The method of claim 17 further comprising storing said copy of said first information from said first or second type of register, and writing said copy of said first information utilizing said second circuitry into at least one of said first or second types of registers in response to processing said completion stage of said first type of instruction.

20. The method of claim 14 further comprising always processing within said first circuitry of said execution stage said second type of instruction by performing only non-arithmetic operations.

21. The method of claim 20 further comprising storing said second information from at least one of said first or second types of registers, and writing said second information utilizing said second circuitry into said third type of register in response to processing said completion stage of said second type of instruction.

22. The method of claim 14 wherein said first type of register is a first type of special-purpose register, and wherein said second type of register is a second type of special-purpose register.

23. The method of claim 22 wherein said third type of register further includes at least one general-purpose register.

24. The method of claim 14 wherein said step of storing a copy of said first information in a plurality of rename buffers further includes:
storing said copy of said first information within a first set of rename buffers; and
storing said second information within a second set of buffers.

25. A method in an information processing system, said method comprising the steps of:
processing within first circuitry an execution stage of a first type of instruction which always specifies at least one of a first type of register or a second type of register, and outputting first information in response thereto;
processing within first circuitry an execution stage of a second type of instruction which always specifies only a third type of register, and outputting second information in response thereto;
storing said output first and second information in a plurality of buffers coupled to said execution stage, wherein at least one of said buffers is for storing said output first information independent of which of said first and second types of registers is specified by said first type of instruction; and
processing within second circuitry coupled to said buffers a completion stage of said first type of instruction, and writing said stored first information into at least one of said first or a second type of register in response thereto;
processing within said second circuitry a completion stage of said second type of instruction, and writing said stored second information into only said third type of register in response thereto; and
writing said stored first information utilizing said second circuitry into at least one of said first or second types of registers, and computing an address of an instruction utilizing third circuitry in response to said written and stored first information.

26. A method in an information processing system, said method comprising the steps of:

processing within first circuitry an execution stage of a first type of instruction which always specifies at least one of a first type of register or a second type of register, and outputting first information in response thereto;

processing within said first circuitry an execution stage of a second type of instruction which always specifies only a third type of register, and outputting second information in response thereto;

storing said output first and second information in a plurality of buffers coupled to said execution stage, wherein at least one of said buffers is for storing said output first information independent of which of said first and second types of registers is specified by said first type of instruction; and processing within second circuitry coupled to said buffers a completion stage of said first type of instruction, and writing said stored first information into at least one of said first or a second type of register in response thereto;

processing within said second circuitry a completion stage of said second type of instruction, and writing said stored second information into only said third type of register in response thereto; and writing said stored first information utilizing said second circuitry into at least one of said first or second types of registers, and branching to an address of an instruction utilizing third circuitry in response to said written and stored first information.

* * * * *